Nov. 20, 1928.  
J. WILSON  
ROTARY PLOW  
Filed Sept. 3, 1927  
1,692,282  
2 Sheets-Sheet 1
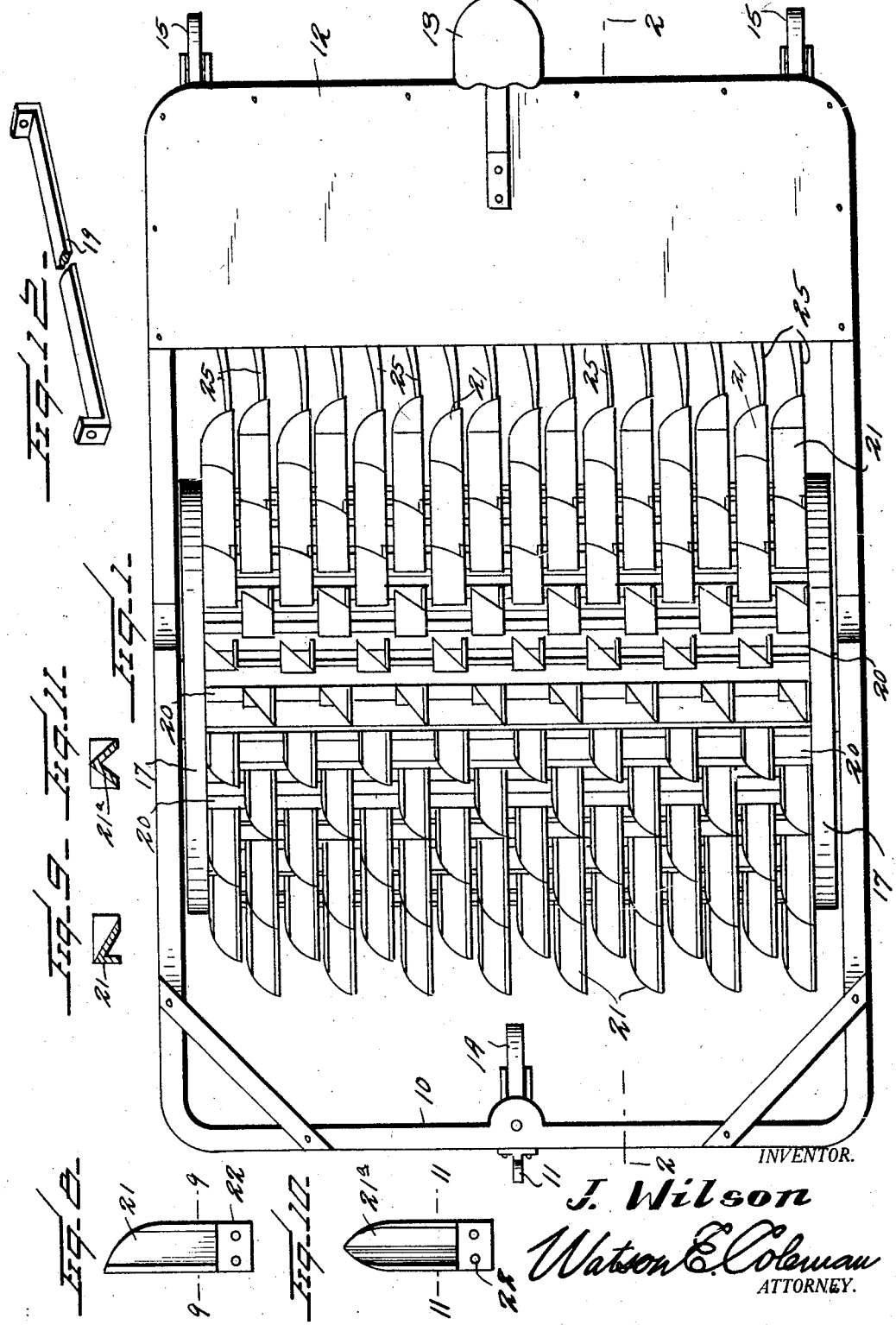
INVENTOR.  
J. Wilson  
Watson E. Coleman  
ATTORNEY.

Nov. 20, 1928.
J. WILSON
ROTARY PLOW
Filed Sept. 3, 1927 2 Sheets-Sheet 2
1,692,282
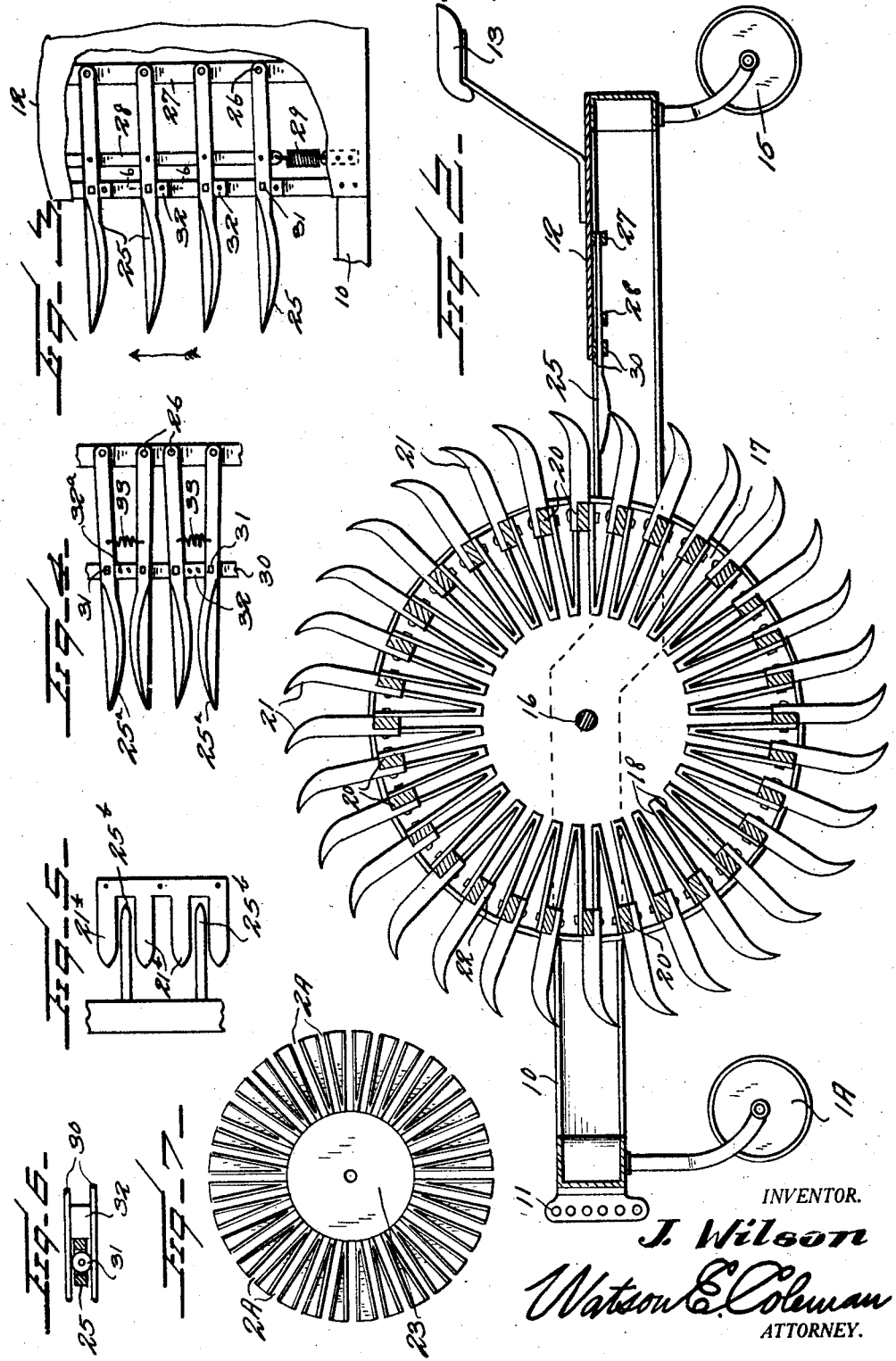
INVENTOR.
J. Wilson
Watson E. Coleman
ATTORNEY.

Patented Nov. 20, 1928.

1,692,282

UNITED STATES PATENT OFFICE.

JAMES WILSON, OF GREAT FALLS, MONTANA.

ROTARY PLOW.

Application filed September 3, 1927. Serial No. 217,403.

This invention relates to rotary plows or implements of like character, and particularly to that class of rotary plow in which there are a plurality of sets of radially disposed blades which, as the plow rotates, are forced into the ground and then raised to thereby break up the ground and do work such as is done by the stubble plow in breaking land.

One of the objects of the invention is to provide a mechanism of this character which is very simple and effective and which will work land with less power than is required for the operation of the ordinary mold board stubble plow.
A further object is to provide a machine of this character which will be particularly valuable for destroying weeds.

Another object is to provide means whereby the teeth of the rotary plow may be cleaned as they rise from the ground, thus preventing the teeth from becoming clogged.

Other objects have to do with the details of construction and arrangement of parts as will appear more fully in the accompanying description.

My invention is illustrated in the accompanying drawings, wherein:—

Figure 1 is a top plan view of a rotary plow constructed in accordance with my invention;
Figure 2 is a longitudinal sectional view of the plow on the line 2—2 of Figure 1;

Figure 3 is a fragmentary plan view of the platform showing the cleaners;

Figure 4 is a top plan view of another form of cleaner;

Figure 5 is a top plan view of another form of cleaner and another form of tooth;

Figure 6 is a section on the line 6—6 of Figure 3;
Figure 7 is a face view of one of the intermediate disks;

Figure 8 is a rear elevation of one form of tooth;

Figure 9 is a section on the line 9—9 of Figure 8;

Figure 10 is a rear elevation of another form of tooth;

Figure 11 is a section on the line 11—11 of Figure 10;
Figure 12 is a perspective view of one of the cross braces.

Referring to these drawings, it will be seen that the plow includes a frame and a cylinder. The frame, which is designated 10, is illustrated as rectangular in form, though I do not wish to be limited thereto, and as shown in side elevation, the forward end of this frame is provided with a clevis 11 whereby draft may be applied, while the rear end of the frame is provided with a platform 12 and a seat 13. The forward end of the frame is supported by the wheel 14 and the rear end by the laterally disposed wheels 15. This frame may be made in any suitable manner and braced as found necessary.

Supported on the frame is the transverse shaft or axle 16 upon which the rotary plow is mounted. This plow consists essentially of the laterally disposed plates 17 at the ends of the plow proper, these plates being formed with radially extending pairs of flanges 18. The plates 17 may be connected by transverse braces 19 and bolts. Disposed between the plates and held in assembled relation thereby are a plurality of teeth. These are mounted upon transverse bars 20 (see Figures 1 and 2), these bars being bolted to the flanges 18 at their extremities, and mounted upon these bars are the teeth 21, 21ª or 21ᵇ (see Figures 8 to 11). In any case, the teeth are provided with base portions 22 which are bolted to the bars 20. There will thus be a plurality of circumferential rows or sets of teeth and preferably the teeth of one circumferential set will break joints or be in staggered relation to the teeth of the next adjacent set, though I do not wish to be limited to this.

The teeth 21, as illustrated in Figure 8, are angular in cross section, but one of the sides of a tooth is in a vertical plane, while the other side of the tooth is downwardly and outwardly inclined. The teeth 21ª, however, are angular in cross section but with both wings disposed at an equal angle to a vertical plane. In both teeth 21 and 21ª, the outer end of the tooth is turned outward so that each tooth has somewhat the shape of a plow point. In Figure 5, the teeth 21ᵇ are perfectly plain flat teeth but disposed in pairs.

It will be obvious now that as the machine is drawn forward by a tractor or by any draft power, these teeth will engage with the ground, and as the machine moves forward each tooth will be forced gradually into the ground and then turned upward so as to dig up the ground to a considerable depth and overturn and break up the clods. In the case of relatively wide machines, intermediate guide plates 23 are provided which are slotted at 24 and which act to support the transverse bars 20. These intermediate disks may be bolted and braced from the end plates 17 in any suitable manner as, for instance, by the braces 19.

For the purpose of dislodging the earth from the faces of the teeth or plow points 21 and 21ª, I provide cleaners, as shown in Figures 3 and 4. The cleaners shown in Figure 3 are for use with the teeth 21. There is a cleaner 25 for each tooth. Each cleaner consists of a bar which is pivoted at 26 upon a cross bar 27 disposed beneath the platform 12 and each cleaner is rounded on its outer face and beveled. The several cleaners 25 are connected to each other for unitary movement by a transverse connecting rod 28 which at one end is connected to a coiled spring 29 connected to the frame 10 of the machine in any suitable manner. A pair of transverse bars 30 are mounted above and below the cleaners and the cleaners are provided with rollers 31 bearing upon these bars so as to support the cleaners as they shift and permit them to be readily shifted against the action of the spring by the action of the teeth 21 or shifted by the spring. Stops 32 are provided which limit the movement of the cleaners in one direction.

As the tooth 21 rises, the beveled face of the tooth will strike the cleaner and shift the cleaner laterally in the direction of the arrow in Figure 3 against the action of the spring 29. Then as the tooth passes, the spring 29 will draw the cleaner back against the stop 32. All of the cleaners will, of course, move together. There will be as many cleaners as there are teeth. Thus the cleaners will act to remove earth from the faces of the teeth and prevent the teeth from becoming clogged. Where the teeth 21ª are used, pairs of cleaners 25ª are used, a pair for each tooth. As illustrated, these cleaners 25ª are pivoted at 26 upon the transverse bar 27 and these cleaners also carry the rollers 31 bearing against the upper and lower bars 30. Stops 32ª are provided between each pair of cleaners, and springs 33 are provided for drawing the two cleaners toward each other and against the stops 32ª. In this case, the teeth 21ª will rise between the pairs of cleaners and the V-shape of each tooth will act to wedge the corresponding cleaners apart until the tooth has passed, whereupon the cleaners will be swung toward each other and against the stop 32ª.

In Figure 5, I have illustrated another form of tooth 21ᵇ, these teeth being arranged in pairs and have illustrated cleaners 25ᵇ which operate between the pairs of teeth.

The general operation of this mechanism will be obvious from what has gone before. As the machine moves over the ground, the teeth are forced into the ground and turn the ground up, and as the teeth move upward past the cleaners 25, 25ª or 25ᵇ, the teeth wedge the cleaners laterally against the face or faces of the teeth, in the case of the teeth 21 and 21ª, or simply move up between the teeth, as in 25ᵇ. When the device is to be transported over roads or under like circumstances where it is not desired that the teeth shall project, the transverse bars 20 may be unbolted from the flanges or equivalent members 18 and the bars shifted inward, carrying the teeth inward, and the bars again be bolted to the flanges so that the teeth are entirely contracted and concealed and the machine will roll over the ground upon the peripheries of the disks 17 or upon the disks 17 and 24. Preferably a curved cover of light sheet metal supported by suitable rods and braces is provided to cover the upper part of the roller and guard against the lines becoming entangled in the teeth or against the operator coming in contact with the rotating teeth.

A machine of the character described is particularly good as a stubble plow or land worker, breaking up the land sufficiently so that it may be worked with a harrow. Inasmuch as this simply rotates over the land, it will not require so much power to operate it as will an ordinary stubble plow and the action of this rotary plow is particularly efficient for destroying weeds.

While I have illustrated the cross bars 20 as being disposed in planes radial to the central axis, it will be understood that these cross bars and the teeth might be disposed in angular relation to the radial planes and furthermore the frame, while it is illustrated as a drop frame, might be a straight frame or any desired type of supporting frame might be used.

I claim:—

1. A mechanism of the character described including a frame, a rotatable structure mounted on the frame and having a plurality of circularly extending rows of teeth, the teeth being angular in cross section, the vertices of the teeth being in advance, and cleaners mounted upon the frame and coacting with the teeth and resiliently urged in a direction toward the vertices of the teeth and shifted across the inclined face of the tooth by the wedging action of the tooth as a tooth passes a cleaner.

2. A mechanism of the character described including a supporting frame, a rotatable structure mounted thereon having a plurality of circularly extending rows of teeth, the teeth being angular in cross section, the vertex of each tooth being in advance, a plurality of cleaners pivotally mounted upon the frame and respectively urged in a direction toward the path of movement of the vertex of the tooth, and means connecting the teeth for unitary movement.

3. A mechanism of the character described including a supporting frame, a rotatable structure thereon having a plurality of circularly extending rows of teeth, the teeth being V-shaped in cross section and the vertex of each tooth being in advance, and a plurality of pairs of cleaners, there being a pair for each tooth, resiliently urged into a position toward the vertex of each tooth, the passage of the teeth between the cleaners acting to wedge the cleaners apart and over the opposed faces of the tooth.

In testimony whereof I hereunto affix my signature.

JAMES WILSON.